United States Patent
Bejerano et al.

(10) Patent No.: US 7,859,995 B2
(45) Date of Patent: Dec. 28, 2010

(54) PROTECTED-FAR-NODE-BASED SOLUTION FOR FAULT-RESILIENT MPLS/T-MPLS MULTICAST SERVICES

(75) Inventors: Yigal Bejerano, Springfield, NJ (US); Pramod V. N. Koppol, Manalapan, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 114 days.

(21) Appl. No.: 12/241,516

(22) Filed: Sep. 30, 2008

(65) Prior Publication Data

US 2010/0080120 A1    Apr. 1, 2010

(51) Int. Cl.
*G06F 11/00* (2006.01)
*H04L 12/26* (2006.01)
*H04L 12/28* (2006.01)

(52) U.S. Cl. .............. 370/218; 370/222; 370/237; 370/238

(58) Field of Classification Search ............. None
See application file for complete search history.

(56) References Cited

U.S. PATENT DOCUMENTS

| | | | |
|---|---|---|---|
| 7,283,741 B2 * | 10/2007 | Sadananda | 398/5 |
| 2003/0016654 A1 * | 1/2003 | Das et al. | 370/351 |
| 2003/0065811 A1 * | 4/2003 | Lin et al. | 709/232 |
| 2004/0111651 A1 * | 6/2004 | Mukherjee et al. | 714/4 |
| 2009/0046572 A1 * | 2/2009 | Leung | 370/216 |
| 2009/0228575 A1 * | 9/2009 | Thubert et al. | 709/220 |
| 2009/0257751 A1 * | 10/2009 | Sadananda et al. | 398/83 |
| 2009/0296719 A1 * | 12/2009 | Maier et al. | 370/400 |

OTHER PUBLICATIONS

Muriel Medard, Steven G. Finn, Richard A Barry, and Robert G. Gallager, Redundant Trees for Preplanned Recovery in Arbitrary Vertex-Redundant or Edge-Redundant Graphs, IEEE/ACM Transactions on Networking, vol. 7, No. 5, Oct. 1999, 12 pages.

* cited by examiner

*Primary Examiner*—Chi H Pham
*Assistant Examiner*—Soon-Dong D Hyun
(74) *Attorney, Agent, or Firm*—Wall & Tong, LLP (57) ABSTRACT

A system and method providing fault resilient multicast services using a network topology in which a source node communicates with a plurality of receiver nodes via at least two disjoint paths in which at least one receiver node is provisioned according to a 1+1 protection mechanism.

20 Claims, 5 Drawing Sheets

PROTECTED-FAR-NODE-BASED SOLUTION FOR FAULT-RESILIENT MPLS/T-MPLS MULTICAST SERVICES

FIELD OF THE INVENTION

The invention relates to the field of communication networks and, more specifically, Label Switching networks.

BACKGROUND

Multi-Protocol Label Switching (MPLS) enables efficient delivery of a wide variety of differentiated, end-to-end services. MPLS supports delivery of such services using a label switched paths (LSPs). Hundreds or even thousands of LSPs may be provisioned in any given MPLS network.

Telecommunications service providers are seeking low cost, bandwidth efficient, and fault-resilient multicast transport for providing MPLS multicast-based services such as "triple play" (Internet/television/telecommunication) services and broadcast TV services. Currently, multicast services are provided via replication at the network edge (i.e., proximate customer access networks), which causes inefficient usage of network bandwidth.

Efforts to support point to multipoint (P2MP) connections are ongoing. While P2MP will help reduce bandwidth inefficiency in the multicast environment, establishing P2MP connections is not sufficient to ensure fault resilient multicast services. There are additional on going efforts to develop Fast reroute (FRR)-like approaches to P2MP protection, yet, these efforts are still in initial stage.

Three major solutions providing fault-resilient multicast services have been developed by the industry, the standards committees and various academic research.

A first solution provides a pair of link/node disjoint point-to-point connections to each destination node. This approach is used, for example, for supporting VPLS. In this solution, separate traffic flows are sent to each destination, which causes inefficient usage of the network bandwidth.

A second solution uses redundant trees. In this approach, two spanning trees are associated with each multicast source node. The trees are constructed in a manner inducing two disjoint paths between a root node "r" and each destination node. The root node "r" sends the multicast traffic on both trees thus every node get two feeds of the multicast flow. Each destination node selects one of the feeds as a primary and the other as backup. The node listens to the primary feed and in case of failure along its primary path it switches to the backup path. The main drawback of this approach is that each destination node needs to detect a failure on the primary path and use such a detection mechanism to switch to its backup feed. Such detection may require additional mechanisms such as, for example, failure notification messages. Such mechanisms significantly increase the failure recovery time.

A third solution provides a fast reroute approach. This approach is an extension of the point-to-point connection fast reroute (FRR) mechanisms. However, extending the FRR to P2MP connections results in several problems, including (a) the need for sending multiple copies of the same packet on the same link and in the same direction; (b) each node involved in signaling multiple sub-LSPs; (c) high operations and management complexity; and (d) a potential need for a significant bandwidth allocation.

BRIEF SUMMARY

Various deficiencies of the prior art are addressed by the present invention of a system and method providing fault resilient multicast services. Specifically, in one embodiment a method for providing fault resilient multicast services, comprises: configuring at least two disjoint paths from a source node to each of a plurality of receiver nodes within a mesh network; mapping over the at least two disjoint paths active paths to each of the plurality of receiver nodes; each receiver node receiving traffic at an ingress port in communication with an active path link and transmitting traffic at an egress port in communication with an active path link; wherein, in the event of a receiver node sensing a received traffic failure, the receiver node communicates a failure notification signal to a preferred ancestor node and the preferred ancestor node responsively transmits traffic to the corresponding receiver node via a backup path. In one modification, at least one of the receiver nodes receives common traffic at ingress ports associated with both active and backup links, the receiver node transmitting a valid one of the commonly received traffic flows at the egress port in communication with active path link.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

The invention will be primarily described within the context of point to multipoint (P2MP) connections within the context of a network supporting Multi-Protocol Label Switching (MPLS), including transport-MPLS (T-MPLS), MPLS transport protocol (MPLS-TP) and so on. However, those skilled in the art and informed by the teachings herein will realize that the invention is also applicable to other network technologies.

Figure 1A:
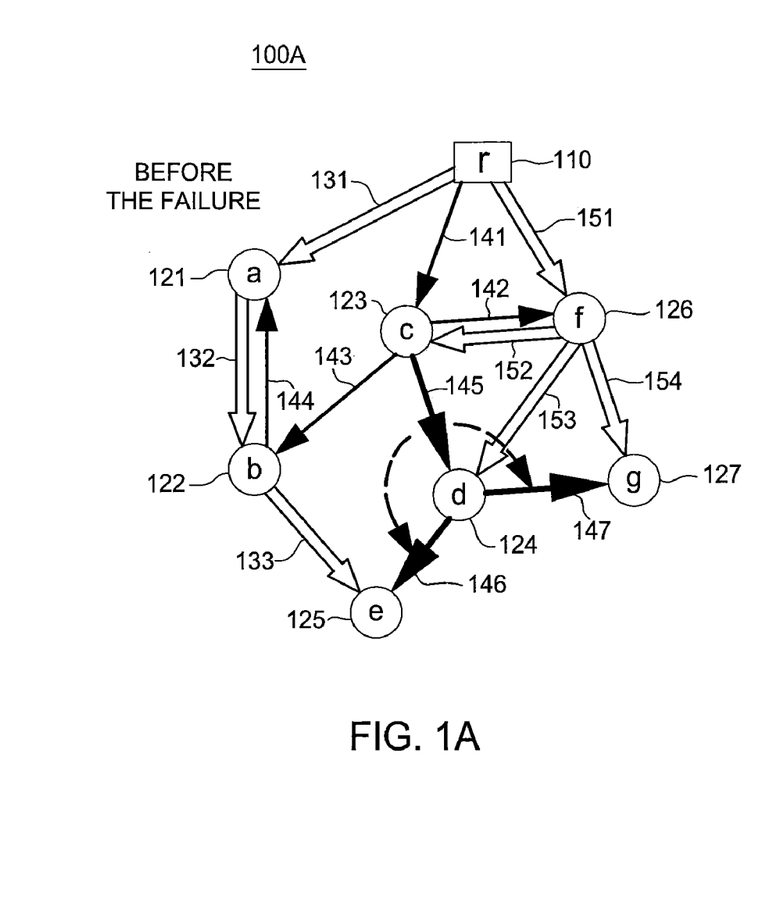
FIG. 1 depicts a high-level block diagram of a mesh network topology according to one embodiment.
Figure 1B:
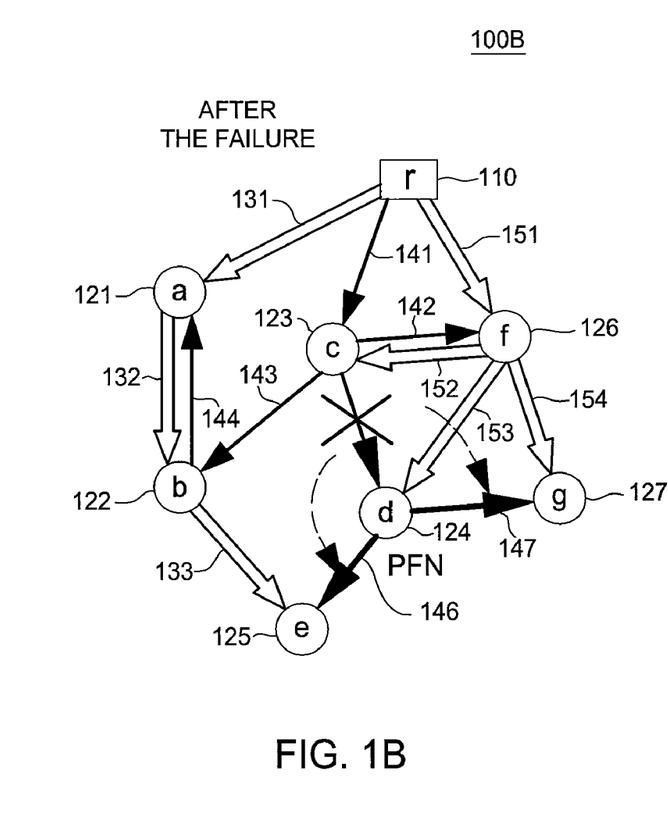

FIG. 1 depicts a high-level block diagram of a mesh network topology according to an embodiment employing a 1+1 protection mechanism. Specifically, FIG. 1A depicts traffic flow prior to a link failure, while FIG. 1B depicts traffic flow after the link failure.

Referring now to FIG. 1A, a network topology 100 A. comprises a root node 110 (also denoted as node r) providing traffic to each of a plurality of network nodes 121-127 (also denoted as nodes (a-g) via a plurality of node disjoint paths (i.e., paths from the root node to every other node) formed with various inter-node links. Specifically, a first path connects nodes 110 and 121 via link 131; nodes 121 and 122 via link 132; and nodes 122 and 125 via link 133. A second path connects nodes 110 and 123 via link 141; nodes 123 and 126 via link 142; nodes 123 and 122 via link 143; nodes 122 and 121 via link 144; nodes 123 and 124 via link 145; nodes 124 and 125 via link 146; and nodes 124 and 127 via link 147. A third path connects nodes 110 and 126 via link 151; nodes 126 and 123 via link 152; nodes 126 and 124 via link 153; and nodes 126 and 127 via link 154.

It is noted that each of the nodes 121-127 receives traffic from at least two other nodes. Specifically, each of the nodes 121-127 has associated with it at least two ingress supports for receiving traffic from corresponding paths and at least one egress port for forwarding traffic to a next node in a corresponding path.

In the example of FIG. 1A, it can be seen that traffic flows to node 124 from each of nodes 123 (via link 145) and 126 (via link 153). The traffic received by node 124 from node 123 is part of the second disjoint path described above. Note 124 includes two egress ports associated with traffic from the second disjoint path. The first egress port provides traffic to node 127 via link 147. The second egress port provides traffic to node 125 via link 146. Each of the node disjoint paths supplies common traffic (i.e., substantially the same traffic) to the various nodes.

Referring to FIG. 1B, it is assumed that link 145 fails, such that traffic is no longer conveyed to node 124 from node 123 (i.e., second disjoint path supporting node 124 fails). In response to this failure, the control/management software associated with node 124 recognizes that valid traffic is no longer being received at the ingress port associated with link 145. In response, the traffic supplied by the third disjoint path from node 123 (link 153) is forwarded to the node 124 egress ports. In this manner, a failure of the second disjoint path immediately prior to node 124 (i.e., link 145) is addressed by forwarding traffic from the third disjoint path to egress ports of node 124.

Advantageously, this response to link failure does not require reconfiguration/repositioning at a network management systems level. It is noted that in various embodiments standard messages are sent to the management system and/or surrounding nodes to indicate that link 145 has failed such that link may be repaired and/or re-provisioned.

Figure 2:
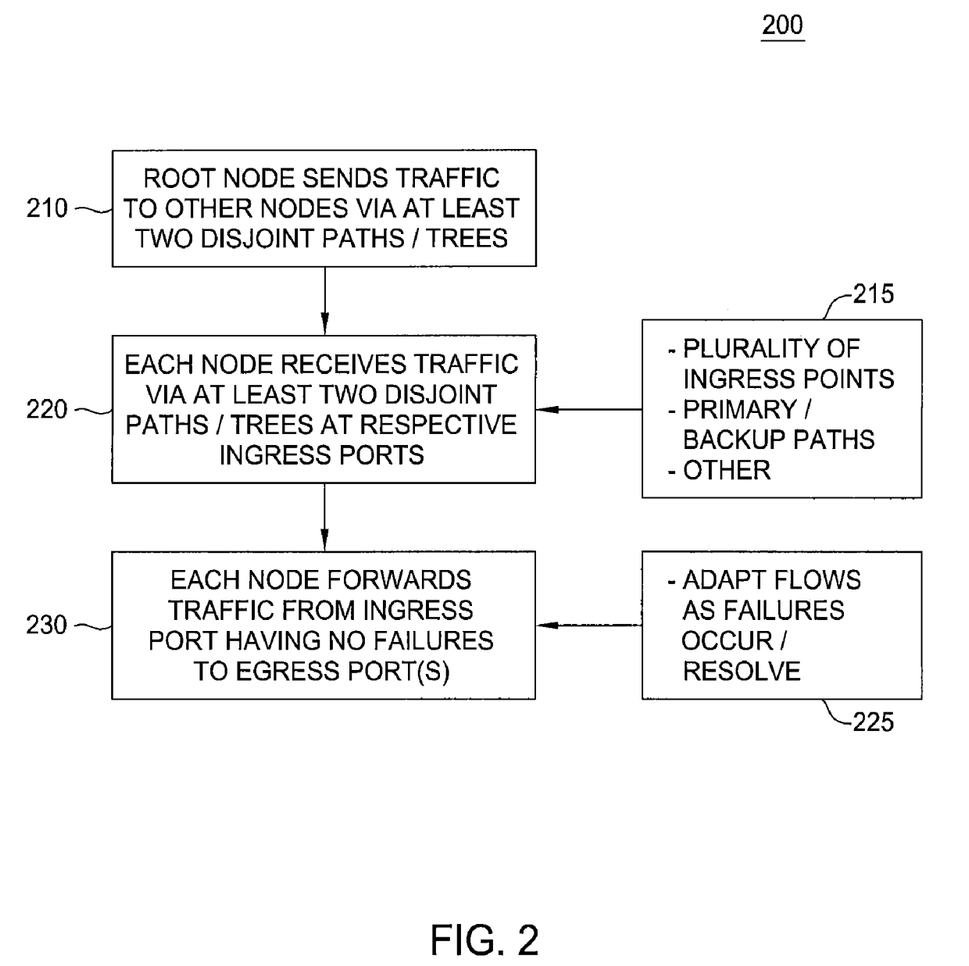
FIG. 2 depicts a flow diagram of a methodology according to an embodiment.

FIG. 2 depicts a flow diagram of a methodology according to an embodiment. Specifically, at step 210 a root node sends traffic to other nodes via at least two disjoint paths or trees, such as the free disjoint paths discussed above with respect to FIG. 1. At step 220, each node receives traffic via at least two disjoint path/trees at respective ingress ports. Referring to box 215, each of the nodes includes a plurality of ingress ports for supporting a primary path and at least one backup path. At step 230, each node forwards traffic from a non-failed ingress port to a more egress ports. As previously noted, flows from ingress to egress ports are adapted as failures associated with links serving ingress ports occur and are repaired/resolved.

The above-described embodiment provides an efficient mechanism using protected P2MP trees to provide fault-resilient P2MP connections with fast recovery/restoration. The inventors note that in case of a node or link failure, all the nodes that are adjacent to the failed node or link detect the failure of the node or link. The inventors define these nodes as either "near nodes" or "far nodes." A "near node" is a node that is located between a root node and the failed node or link, and feeds traffic to the failed node or link. A "far node(s)" is a node that receives traffic from the failed node or link. The inventors also note that in the redundant tree protected P2MP approach, every node is attached to the multicast source node (the root node) by two disjoint paths.

Thus, in the case of a failure the far nodes detect the failure and still get a multicast feed from their backup path. That is, when a node detects a failure on its primary path, it becomes a protected far node (PFN). The PFN switches from its primary path to its backup path and starts forwarding traffic from backup path (ingress port) on both downstream trees.

An advantage of the embodiment is the fact that failure is transparent to every other node except the nodes that are adjacent to the failed link or other network component. This embodiment enables the performance of a fast failure restoration without sending any failure notification messages. The various embodiments enabled efficient support for fault-resilient MPLS multicast services by significantly reducing the required bandwidth. Various tests performed by the inventors indicate that the topology and processing associated with FIGS. 1 and two resulted in a 30% reduction in bandwidth as compared with a standard FRR approach for P2MP connections. In addition, signaling and management overhead is reduced while supporting a sub 50-ms fault recovery time.

The above-described embodiments contemplate a root node communicating with each of a plurality of network nodes using at least two P2MP trees to induce thereby at least two node disjoint paths from the root node to the other network nodes. In this manner, in response to any single failure scenario, each network node may be reached via at least one of the P2MP trees.

In a 1+1 mode of operation, common data traffic is forwarded on each of the P2MP trees and each receiver node switches from an active path to a standby path in case of a failure on the active path. In a 1:1 mode of operation, data is initially forwarded only to the active P2MP tree. In response to a failure, data is then sent to the network nodes via both trees until the failure is fixed.

Figure 3:
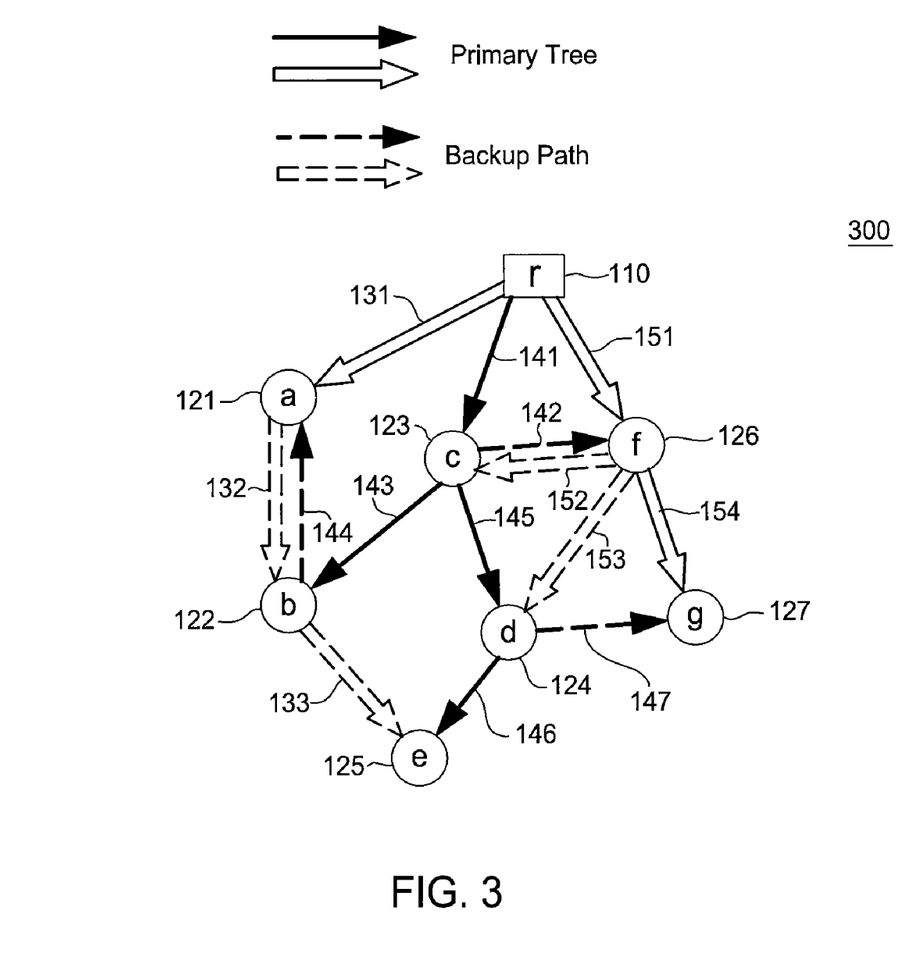
FIG. 3 depicts a high-level block diagram of a mesh network topology according to another embodiment.

FIG. 3 depicts a high-level block diagram of a mesh network topology according to another embodiment. Specifically, FIG. 3 depicts a high-level block diagram of a modified version of the network topology discussed above with respect to FIG. 1. The modification associated with FIG. 3 is the use of a 1:1 mode fault recovery mechanism. In this embodiment, the links forming the three disjoint paths discussed above with respect to FIG. 1 are present. However, some of the links are deemed to be part of an active path while some of the links are deemed to be part of a backup path. Traffic is initially sent only via the active path links. In response to a failure, traffic is sent via the backup path links to the extent necessary. In this manner, bandwidth is conserved.

Referring to FIG. 3, every node is associated with an active path (i.e., at least one of the three disjoint paths or trees). Traffic is sent only via the active path links; other links are used as backup only. The active paths define a primary tree. The primary tree may comprise links within one or more of the previously defined disjoint paths or trees. In the example of FIG. 3, a primary tree is defined by the following active links: 131, 141, 151, 143, 145, 154 and 146. The backup links comprise links 142, 152, 153, 147, 146, 132, 144 and 133. Thus, seven primary and seven backup bandwidth units (i.e. links) are defined.

Each node has associated with it a preferred backup path ancestor node (i.e., preferred backup node). That is, in the event of a failure of a primary link serving a particular node, where multiple backup links served that node one of those backup links is deemed to be a preferred back up link which links the particular node to a preferred ancestor node. Upon failure of the primary link serving the particular node, the particular node sends a failure notification to the preferred ancestor node. In response, the preferred ancestor node begins forwarding traffic to the particular node via the preferred backup link.

Figure 4:
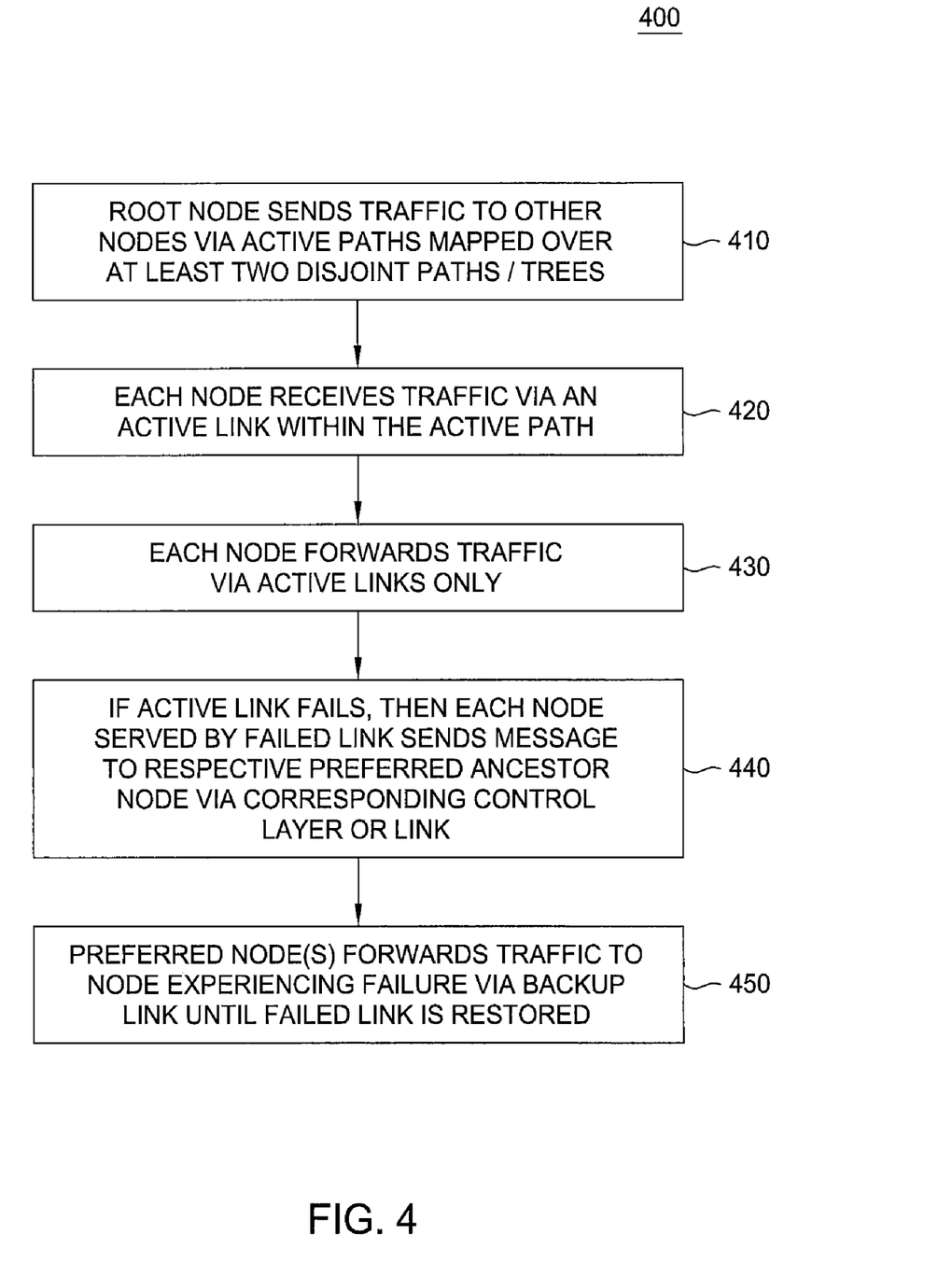
FIG. 4 depicts a flow diagram of a methodology according to another embodiment.

FIG. 4 depicts a flow diagram of a methodology according to another embodiment. Specifically, at step 410 a root node sends traffic to other nodes via active paths mapped over at least two disjoint paths/trees within a network. At step 420, each node receives traffic via a corresponding active link within the active path. At step 430, each node talks to other nodes via active links only. At step 440, if an active link fails, then each node served by the failed active link sends a message to its respective preferred ancestor node via a corresponding control layer, backup link, messaging system and the like. At step 450, the preferred ancestor node or nodes forwards traffic to the corresponding node or nodes experiencing a failure condition via a corresponding preferred backup link or links until such time as the failure condition is resolved. In one embodiment, the preferred ancestor node propagates failure messages toward an element management system (EMS) and/or network management system (NMS), which system responsively reprovisions and/or restores the failed link or links.

Upon detecting that the active link failure has been resolved, the node served by the previously failed link sends a message to its respective preferred ancestor node indicative of this restoration of service. At this time, the preferred ancestor node may cease sending traffic via the preferred backup link. Alternatively, the EMS or NMS may have determined that the backup link shall now be an active link. In this case, the preferred ancestor node associated with the node experiencing the failure may be adapted/changed to be the node associated with the previously failed active path link.

At the 1+1 operation mode, the root node sends the multicast traffic on both trees such that every node get two feeds of the multicast flow. Each destination node selects one of the feeds as a primary and the other as backup. Thus, in the case of a failure the Protected-Far-Node (PFN) switches from its primary path to its backup path and start forwarding traffic from the backup path (ingress port) on both downstream trees. While this approach allows very fast failure recovery time, it requires to support two active multicast flows to every node.

FIG. 5 depicts a high-level block diagram of a mesh network topology according to another embodiment. The topology as well as the nodes and links depicted in FIG. 5 are designated in substantially the same manner as previously described with respect to FIGS. 1 and 3. In addition, a first failure notification path 161 supports a failure communication from node 122 to 121, a second failure notification path 162 supports a failure communication from node 124 to node 126, and a third failure notification path 163 supports a failure communication from node 125 to node 122. While three failure notification paths are described herein, it will be appreciated that each of the nodes 121 through 127 has associated with it a respective failure notification path which is used to communicate a failure condition to a preferred ancestor node.

Figure 5A:
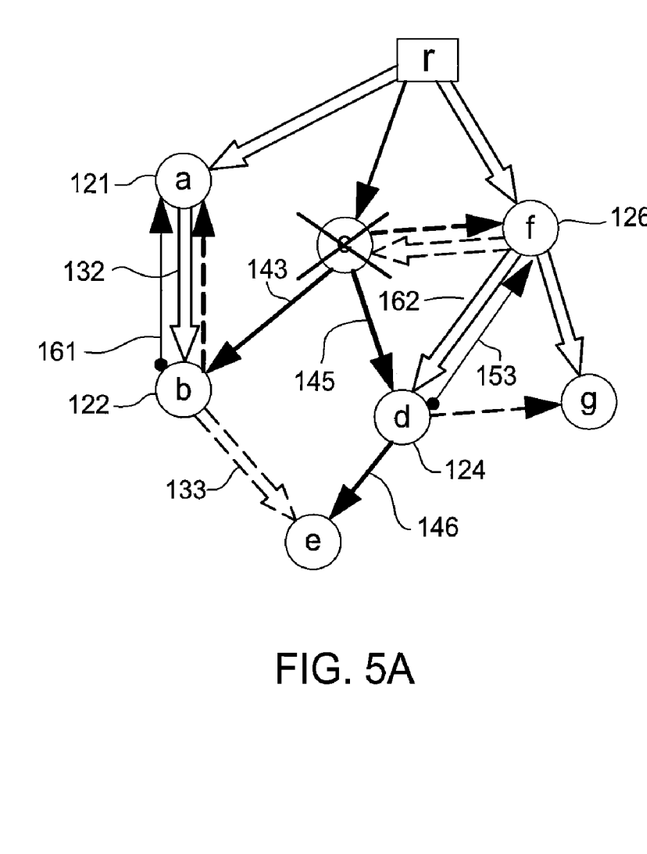
FIG. 5 depicts a high-level block diagram of a mesh network topology according to another embodiment.

FIG. 5A depicts a failure of node 123. In this instance, since node 123 supports active link 143 to node 122 as well as active link 145 to node 124, both of nodes 122 in 124 must now be provided traffic via their corresponding backup paths. Specifically, node 122 transmits a failure notification signal via path 161 to its preferred ancestor node, node 121. In response, node 121 transmits traffic to node 122 via link 132. Similarly, node 124 transmits a failure notification signal via path 162 to its preferred ancestor node, node 126. In response, node 126 transmits traffic to node 124 via link 153. Thus, by using active paths and preserving backup paths, bandwidth is conserved within the network. The backup resources supporting a node may be shared with other nodes. Notification messages are sent to a preferred ancestor node, such as the closest active node on a backup path, rather than all the way back to the root node.

Figure 5B:
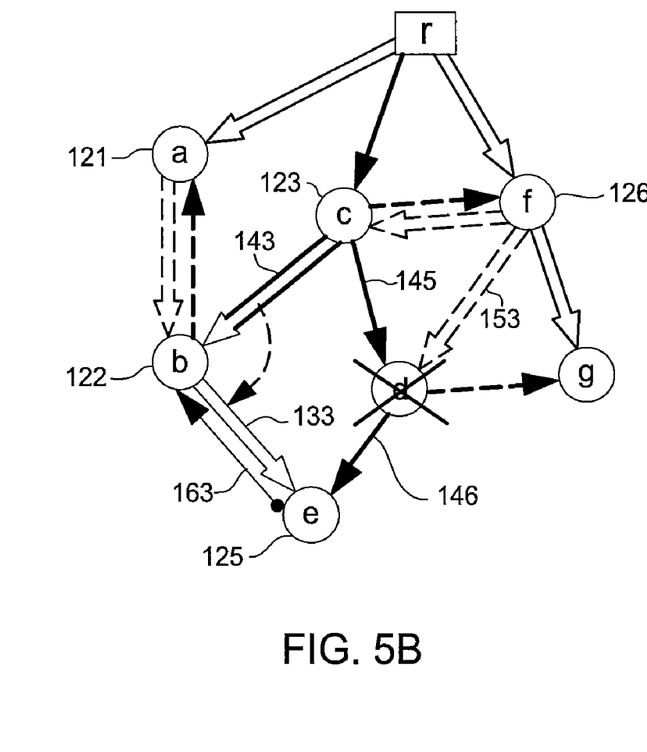

FIG. 5B depicts a failure of node 124. In this instance, since node 124 supports active link 146 two and 125, 125 must now be provided traffic via its corresponding backup path. Specifically, node 125 transmits a failure notification signal via path 163 to its preferred ancestor node, node 122. In response, node 122 transmits traffic to node 125 via link 133.

The above-described embodiments enable network operators to find a cost-effective balance between the bandwidth allocation for the multicast services and a failure recovery time. The proposed mechanism further reduces the bandwidth requirements for multicast services. The various embodiments provide efficient utilization of protected P2MP trees at 1:1 operation mode for fast restoration while providing efficient bandwidth utilization.

The above-described Protected P2MP trees with PFN failure recovery mechanism is based on associating two spanning trees with each multicast source node. The trees are constructed in a manner inducing two disjoint paths between the root node r and each destination node. The various embodiments have associated with them certain trade-offs between failure recovery time and bandwidth utilization levels. For example, within the context of 1+1 provisioning, every node receives multiple signal feeds such that the loss of any one signal feed is quickly replaced by an alternate signal feed. Thus, failure recovery time and control signal burdens are reduced at the expense of increased bandwidth requirements. Within the context of 1:1 provisioning, every node receives a signal feed from a primary path. A loss of this primary path signal results in a provisioning and switch over to a backup path signal. Thus the allocated backup resources (bandwidth) can be shared with other connections for improving the network utilization.

In an augmented 1:1 operation mode embodiment, an alternative utilization of the Protected P2MP trees is provided wherein trade-offs between failure recovery time and bandwidth requirements are modified. Specifically, an augmented 1:1 embodiment may be used to adapt any of the arrangements described above with respect to FIGS. 3-5, such as in the case of a relatively large distance between a particular node and its preferred ancestor. Specifically, a latency problem tends to exist where the distance between a node and its preferred ancestor node is very long or if neighbor nodes are not destination nodes. In this case, traffic is provided to the node via both an active link and the backup link such that the transition time between traffic cessation via an active link and traffic initiation via the backup link is rapid. This trade-off is appropriate where relatively long node to node distances exist and/or a desire to avoid failure notification signaling and management is desired. This also enables tradeoffs between bandwidth consumption and failure recovery time.

Thus, one embodiment comprises a mesh network topology in which a source node is configured to communicate with each of a plurality of receiver nodes via an active path mapped over at least two disjoint paths, each receiver node receiving traffic at an ingress port in communication with an active path link and transmitting traffic at an egress port in communication with an active path link. In the event of a receiver node sensing a received traffic failure, the receiver node communicates a failure notification signal to a preferred ancestor node and the preferred ancestor node responsively transmits traffic to the corresponding receiver node via a backup path associated with that receiver node. In one embodiment, a first portion of the receiver nodes are provisioned according to a 1:1 protection mechanism and a second portion of the receiver nodes are provisioned according to a 1+1 protection mechanism. In one embodiment, a single node is provisioned according to the 1+1 protection mechanism. The one or more receiver nodes provisioned according to the 1+1 protection mechanism comprise the one or more receiver nodes separated from their respective preferred ancestor nodes by a threshold distance (which affects response time). Alternatively, the one or more 1+1 protection nodes that comprise those nodes associated with respective preferred ancestor nodes and/or links which tend to exhibit a relatively slow restoration characteristic, such as lower bandwidth links, nodes with slower switching capabilities and the like. In either case, the 1+1 protection mechanism may be used where the latency associated with a 1:1 protection mechanism is unacceptable to the customer and/or service provider. The logic stated herein with respect to selecting which nodes to provisioned according to a 1+1 protection mechanism is applicable to any of the other embodiments discussed herein.

The main advantage of the various embodiments is the fact that they enable system operators to determine an economical balance between the response time and the bandwidth consumption, while keeping the required amount and travel distance of failure notification messages as minimal as possible. This approach preserves the attractive properties of the PFN-based solution for fault-resilience multicast services, including the basic property that the failure is transparent to all the downstream destination nodes of the PFN node.

In various embodiments, servers, clients, routers, access elements and/or other network elements are discussed herein. Each of these network elements or devices comprises at least one processor, various support circuitry, input-output (I/O) circuitry, memory, communication buses and so on for receiving, processing, providing and/or exchanging information. The at least one processor may be any conventional processor for executing programs or software instructions stored in memory. The memory may be any conventional volatile memory (e.g., RAM, DRAM, among others), non-volatile memory (e.g., disk drives, floppy, drives, CDROM, EPROMS, among other computer readable medium) or any other conventional memory device for storing data and various control programs, such as methodology according to the present invention. The processor cooperates with conventional support circuitry, such as power supplies, clock circuits, cache memory and the like, as well as circuits that assist in executing the various programs and routines, as well as other programs and data. As such, it is contemplated that some of the process steps discussed herein as software processes may be implemented within hardware, for example, as circuitry that cooperates with the processor to perform various steps. The input/output (I/O) circuitry forms an interface between the various functional elements communicating with each network element.

Although the various network elements and devices described herein are depicted as general-purpose computers that are programmed to perform various control functions in accordance with the present invention, the invention can be implemented in hardware such as, for example, an application specific integrated circuit (ASIC). As such, it is intended that the processes described herein be broadly interpreted as being equivalently performed by software, hardware, or a combination thereof.

The invention may be implemented as a computer program product wherein computer instructions, when processed by a computer, adapt the operation of the computer such that the methods and/or techniques of the present invention are invoked or otherwise provided. Instructions for invoking the inventive methods may be stored in fixed or removable media, transmitted via a data stream in a signal bearing medium such as a broadcast medium, and/or stored within a working memory within a computing device operating according to the instructions.

While the foregoing is directed to various embodiments of the present invention, other and further embodiments of the invention may be devised without departing from the basic scope thereof. As such, the appropriate scope of the invention is to be determined according to the claims, which follow.

What is claimed is:

1. A method for providing fault resilient multicast services, comprising:
    configuring at least two disjoint paths from a source node to each of a plurality of receiver nodes within a mesh network;
    mapping over the at least two disjoint paths an active path to each of the plurality of receiver nodes;
    each receiver node, receiving traffic at an ingress port in communication with an active path link and transmitting traffic at an egress port in communication with an active path link, is communicatively coupled to a preferred ancestor node associated with a back-up path;
    wherein, in the event of a receiver node sensing a received traffic failure, the receiver node communicates a failure notification signal to the preferred ancestor node and the preferred ancestor node responsively transmits traffic to the corresponding receiver node via the backup path.

2. The method of claim 1, wherein at least one of the receiver nodes receives common traffic at ingress ports associated with both active and backup links, the receiver node transmitting a valid one of the commonly received traffic flows at the egress port in communication with active path link.

3. The method of claim 1, wherein each receiver node traffic at each of a plurality of ingress ports in respective communication with active path lengths and transmitting valid traffic at said egress port in communication with said active path link.

4. The method of claim 3, wherein a first of said disjoint paths comprises a primary path and a second of said disjoint paths comprises a backup path.

5. The method of claim 3, wherein valid traffic comprises traffic associated with a non-failed link.

6. The method of claim 1, wherein a first portion of the receiver nodes are provisioned according to a 1:1 protection mechanism and a second portion of the receiver nodes are provisioned according to a 1+1 protection mechanism.

7. The method of claim 6, wherein receiver nodes provisioned according to the 1+1 protection mechanism comprise one or more receiver nodes separated from their respective preferred ancestor nodes by a threshold distance.

8. The method of claim 6, wherein receiver nodes provisioned according to the 1+1 protection mechanism comprise one or more receiver nodes separated from their respective preferred ancestor nodes by a low bandwidth link.

9. The method of claim 6, wherein receiver nodes provisioned according to the 1+1 protection mechanism comprise one or more receiver nodes associated with preferred ancestor nodes exhibiting a slow restoration characteristic.

10. A mesh network topology, comprising:
    a source node in configured to communicate with each of a plurality of receiver nodes via an active path mapped over at least two disjoint paths, each receiver node, receiving traffic at an ingress port in communication with an active path link and transmitting traffic at an egress port in communication with an active path link, is communicatively coupled to a preferred ancestor node associated with a back-up path;
    wherein, in the event of a receiver node sensing a received traffic failure, the receiver node communicates a failure notification signal to the preferred ancestor node and the preferred ancestor node responsively transmits traffic to the corresponding receiver node via the backup path.

11. The mesh network topology of claim 10, wherein a first portion of the receiver nodes are provisioned according to a 1:1 protection mechanism and a second portion of the receiver nodes are provisioned according to a 1+1 protection mechanism.

12. The mesh network topology of claim 11, wherein receiver nodes provisioned according to the 1+1 protection mechanism comprise one or more receiver nodes separated from their respective preferred ancestor nodes by a threshold distance.

13. A method for providing fault resilient multicast services, comprising:
configuring at least two disjoint paths from a source node to each of a plurality of receiver nodes within a mesh network; wherein
each receiver node, receiving traffic via at least one of a plurality of ingress ports and transmitting valid traffic via a respective output port, is communicatively coupled to a preferred ancestor node associated with a back-up path;
wherein, in the event of a receiver node sensing a received traffic failure, the receiver node communicates a failure notification signal to a preferred ancestor node and the preferred ancestor node responsively transmits traffic to the corresponding receiver node via a backup path.

14. The method of claim 13, wherein a first of said disjoint paths comprises a primary path and a second of said disjoint paths comprises a backup path.

15. The method of claim 13, wherein valid traffic comprises traffic associated with a non-failed link.

16. The method of claim 13, wherein a first portion of the receiver nodes are provisioned according to a 1:1 protection mechanism and a second portion of the receiver nodes are provisioned according to a 1+1 protection mechanism.

17. The method of claim 16, wherein receiver nodes provisioned according to the 1+1 protection mechanism comprise one or more receiver nodes separated from their respective preferred ancestor nodes by a threshold distance.

18. The method of claim 16, wherein receiver nodes provisioned according to the 1+1 protection mechanism comprise one or more receiver nodes separated from their respective preferred ancestor nodes by a low bandwidth link.

19. The method of claim 16, wherein receiver nodes provisioned according to the 1+1 protection mechanism comprise one or more receiver nodes associated with preferred ancestor nodes exhibiting a slow restoration characteristic.

20. A computer non-transitory readable medium for storing instructions which, when executed by a computer, cause the computer to perform a method for providing fault resilient multicast services, the method comprising:
configuring at least two disjoint paths from a source node to each of a plurality of receiver nodes within a mesh network;
mapping over the at least two disjoint paths an active path to each of the plurality of receiver nodes;
each receiver node, receiving traffic at an ingress port in communication with an active path link and transmitting traffic at an egress port in communication with an active path link, is communicatively coupled to a preferred ancestor node associated with a back-up path;
wherein, in the event of a receiver node sensing a received traffic failure, the receiver node communicates a failure notification signal to the preferred ancestor node and the preferred ancestor node responsively transmits traffic to the corresponding receiver node via the backup path.

* * * * *